(12) United States Patent
Sustersic et al.

(10) Patent No.: US 11,515,769 B2
(45) Date of Patent: Nov. 29, 2022

(54) METHOD AND APPARATUS FOR COMPACT INSERTION OF MULTIPHASE PSEUDO HELICAL WAVE WINDING INTO ELECTRICAL MACHINE

(71) Applicant: Elaphe Propulsion Technologies Ltd., Ljubljana (SI)

(72) Inventors: Gasper Sustersic, Ljubljana (SI); Luka Vodeb, Sromlje (SI)

(73) Assignee: Elaphe Propulsion Technologies Ltd., Ljubljana (SI)

(*) Notice: Subject to any disclaimer, the term of this patent is extended or adjusted under 35 U.S.C. 154(b) by 310 days.

(21) Appl. No.: 16/764,611

(22) PCT Filed: Nov. 17, 2017

(86) PCT No.: PCT/SI2017/000031
§ 371 (c)(1),
(2) Date: Jul. 22, 2020

(87) PCT Pub. No.: WO2019/098949
PCT Pub. Date: May 23, 2019

(65) Prior Publication Data
US 2020/0395832 A1 Dec. 17, 2020

(51) Int. Cl.
| H02K 15/06 | (2006.01) |
| H02K 1/16 | (2006.01) |
| H02K 3/12 | (2006.01) |
| H02K 3/18 | (2006.01) |
| H02K 15/00 | (2006.01) |
| H02K 15/04 | (2006.01) |

(52) U.S. Cl.
CPC ............ *H02K 15/066* (2013.01); *H02K 1/16* (2013.01); *H02K 3/12* (2013.01); *H02K 3/18* (2013.01); *H02K 15/0031* (2013.01); *H02K 15/0037* (2013.01); *H02K 15/0478* (2013.01); *H02K 2213/03* (2013.01); *H02K 2213/12* (2013.01)

(58) Field of Classification Search
CPC .......... H02K 15/066; H02K 3/18; H02K 1/16; H02K 15/0037; H02K 3/12; H02K 15/0478; H02K 15/0031; H02K 15/0407
See application file for complete search history.

(56) References Cited

U.S. PATENT DOCUMENTS 4,864,715 A * 9/1989 Sadier ............... H02K 3/12
29/605
2004/0261256 A1* 12/2004 Sadiku ............... H02K 15/0478
29/732

* cited by examiner

*Primary Examiner* — Leda T Pham
(74) *Attorney, Agent, or Firm* — MacCord Mason PLLC (57) ABSTRACT

A method and an apparatus for compact insertion of thick wire multiphase pseudo helical wave winding into a ferromagnetic core of an electrical machine, achieving high fill factor of the core slots, resulting in better heat transfer between the winding and the core, low mass and volume, and overall higher efficiency of electrical machine. An apparatus being fully programmable and physically adaptable to wide range of electric machine dimensions, where process is automated, simple, accurate, reliable and quick, while being suitable for mass production.

20 Claims, 5 Drawing Sheets

METHOD AND APPARATUS FOR COMPACT INSERTION OF MULTIPHASE PSEUDO HELICAL WAVE WINDING INTO ELECTRICAL MACHINE

TECHNICAL FIELD

The present invention relates to the method and apparatus for compact insertion of thick conductor (solid slot) wave winding to electrical machine, whereby electrical machine being an electrical motor or a generator.

BACKGROUND ART

The present invention offers a solution relating to a method and an apparatus for compact insertion of thick conductor multiphase pseudo helical wave winding, or a similar form of winding into a ferromagnetic core of an electrical machine, achieving high fill factor of the core slots, resulting in better heat transfer between the winding and the core, low mass and volume, and overall higher efficiency of electrical machine. An apparatus presented is being fully programmable and physically adaptable to wide range of electric machine types, wherein process is automated, simple, accurate, reliable and quick, while with certain adjustments, being suitable for mass production of several different motor sizes.

Constant striving for the best possible electrical machine performance in terms of maximum torque, power, and efficiency, is the prime mover of research and development in this technical field. This goal is greatly contributed by high ratio between lengths of active and passive part of the winding, high fill factor which means more conductor material in the stator core grooves (improved efficiency and heat transfer from the winding to the stator core), and low mass and volume of the electric machine, wherein the latter being provided in particular by a compact winding of the electric machine.

There are several versions of windings that allow a compact layout, wherein the winding may consist of a solid thick wire or multiple thin wires. In electrical machines with the aforementioned characteristics, the most common are so-called group windings, of which wave windings are mostly used, where conductor geometry is in the form of meanders that swirl among stator poles. In the case of thick electrical conductor wave windings, the industry still uses manual winding procedures that are time-consuming and therefore expensive.

Common automated winding process is usually so-called bobbin process, which involves winding of a stator pole with multiple conductor wrappings. One of the few known automated processes for forming a wave winding from a thick conductor is so-called hair-pin process, where the machine builds a winding from several very short segments, which are then usually axially inserted into core slots, and either during insertion or when all segments are inserted, are connected by soldering, welding or even crimping. Due to high probability of poor connections, short-circuits may occur between the connected segments. Since the segments are inserted into the core slots with a loose fit, their heat dissipation ability is severely reduced, while extra time and cost of joining the segments represent additional disadvantage.

For example, in patent application GB2052884A presented solution focuses on very short segments (two poles in this case), which are first assembled outside the armature and then mounted inside, where, as already mentioned, much longer segments (of six pole pairs or more) and direct inside winding assembly, are needed for improved machine performance. Patent application US20040261256A1 describes a process and a machine for simple production and insertion of a wave winding from a thick conductor into a rotor or stator of an electric machine. The wave winding is made in a shape of a strip in a predominantly flat shape and then cut to a final length. With a winding that is deformed only in two dimensions, high enough overall compactness cannot be achieved, especially in an area of overhangs. The solution proposed in US20130127270A1 deals with the process of inserting a continuous electric conductor of a rectangular cross-section into the stator core. It is focused on process of widening the core slot width by first bending the stator ferromagnetic core segment in one direction to form the arch shape which widens the slots on top (where the conductor enters the slot), and narrows the slot at its bottom. In such a way the conductor can pass the top of the t-shaped stator tooth, where the top of the tooth is widened compared to its width elsewhere due to desire for cogging torque and torque ripple reduction. At the end, when all conductors are positioned in slots, the stator core, with already inserted windings, is bent in the opposite direction, making the entrance for the conductor even smaller. Compact winding can be designed without any bending of the stator core, and different reduction techniques for cogging torque and ripple torque can be used. The procedure is time-consuming, since the stator poles deform twice, in addition, the final winding does not provide compactness.

Solution presented in patent US20140145540A1 deals with an innovative structure of the wave winding, suitable for electric machines with large value of magnetic periods, which provides the optimal fit of neighboring winding overhangs, so that the winding has large density, is more compact, and is easy to produce at the same time. Advantages of the described constructional solution are particularly high specific torque of the machine and high power, improved energy efficiency, high heat transfer coefficient, high heat conductivity from the winding to the stator core and therefore improved cooling of the machine, and easy assembly process of the motor.

The wave winding covered in US20140145540A1 patent is hereby an object of a method and an apparatus for compact insertion of the same and similar forms of wave windings.

BRIEF DESCRIPTION OF THE DRAWINGS

An exemplary embodiment of the present invention is illustrated by way of example in the accompanying drawings in which.

Identical or corresponding elements have the same reference signs throughout the description.

SUMMARY OF THE INVENTION

The described technical problem is solved by a method and an apparatus according to the invention, the main features of which are defined in independent claims.

Figure 1:
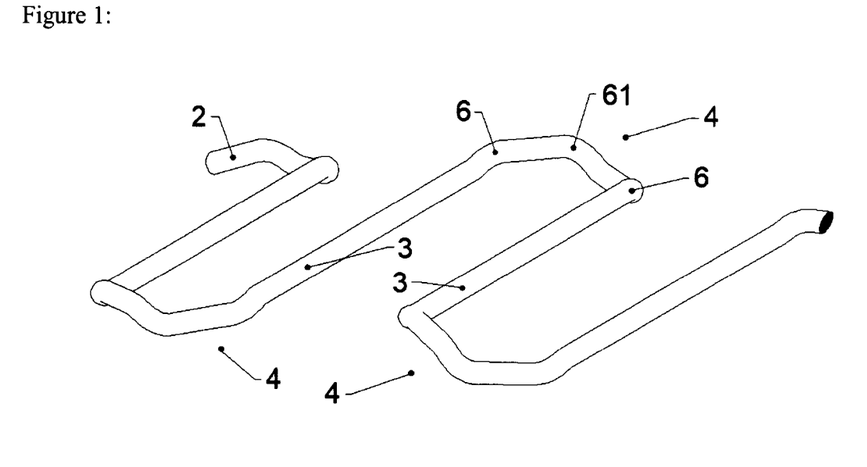
FIG. 1 is an axonometric sectional representation of a multiphase pseudo helical formed wave band.
Figure 2:
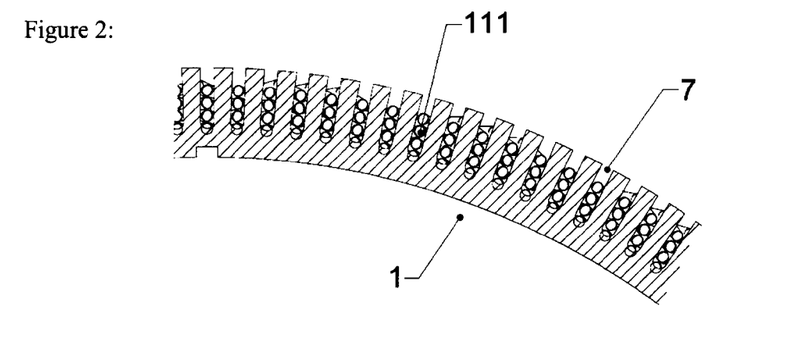
FIG. 2 is a section representation of a ferromagnetic core slots with inserted multiphase pseudo helical wave winding.

This method of compact insertion of the thick conductor (2—FIG. 1) into ferromagnetic stator core (1) demands that conductor is in pre-formed wire band (8) shape with specific geometry, characteristics of which could best be explained as a wave winding with slight deformations in the third dimension. The conductor being inserted into stator core slots (7), comprises flat sections (3—FIG. 1) and overhangs (4—FIG. 1) (also called end-windings), and forms a winding which can be called pseudo helical wave winding. In the case of a pseudo helical winding, the overhangs start where a certain flat (straight) segment (3—FIG. 1) ends, and end where next flat segment starts. Starting and ending parts of the overhang (6—FIG. 1) have different orientation in radial direction than the center of the overhang (61—FIG. 1). Radial direction is considered as the direction from the center axis of the ferromagnetic core towards outer circumference of the core, and vice versa, assuming core shape is cylindrical. Specific deformations of the overhangs enable greater spatial efficiency, and optimal layering of individual conductors. Individual conductors inserted into ferromagnetic core do not intertwine. The two adjacent conductors of the same phase are always one above the other, which enables a simple production process and a very compact winding. The winding consists of at least as many conductors as there are the phases of an electric machine, inserted into multiple layers on the stator core, wherein conductors can have a round, square, or some other cross-section shape. The conductors are inserted separately and in segments, each conductor is inserted everywhere above the lower radial layer in such a way that there is no intertwining. The special feature is that in each radial layer in each slot, there is only one conductor, completed winding usually having 4 to 6 radial layers.

The force of conductor insertion is variable, depending on radial layer at which the straight segment needs to be positioned, and is not more than 20% different from the force calculated by the equation $F_1=F_0+(n \cdot c)$, where n is the layer number, counted from the lowest radially positioned conductor, $F_0$ is the empirically defined baseline force, $F_1$ is the insertion force for first layer, and c represents empirically defined constant. A gradual increase of insertion force for every sequential layer is required, since the increasing number of layers to be pushed into optimal depth raises overall resistance. Empirical values represent safe boundary conditions for insertion process within a range of an optimal overall winding thickness, without damage to conductor insulation.

Figure 3:
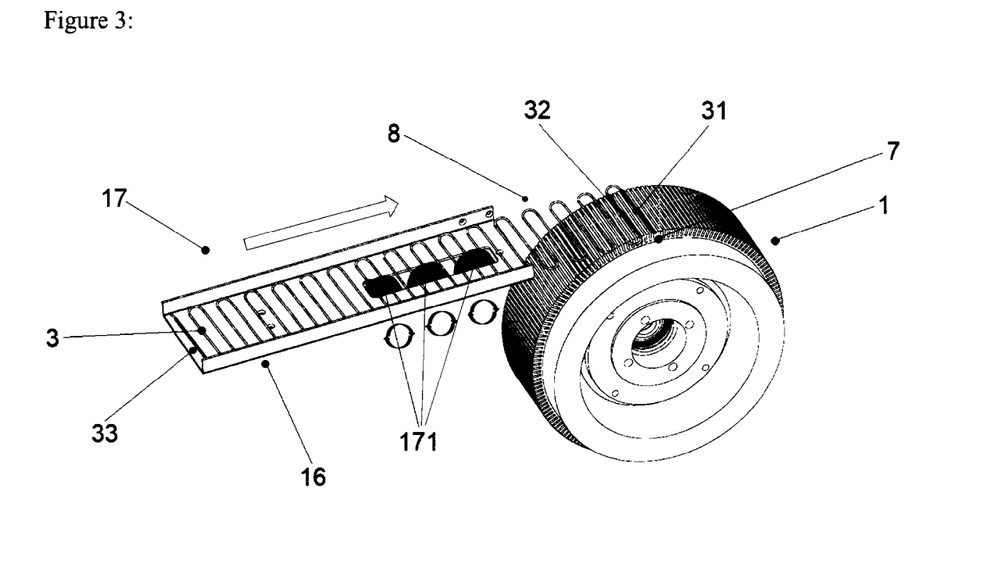
FIG. 3 is an axonometric representation of the formed wire band feeding step.
Figure 4:
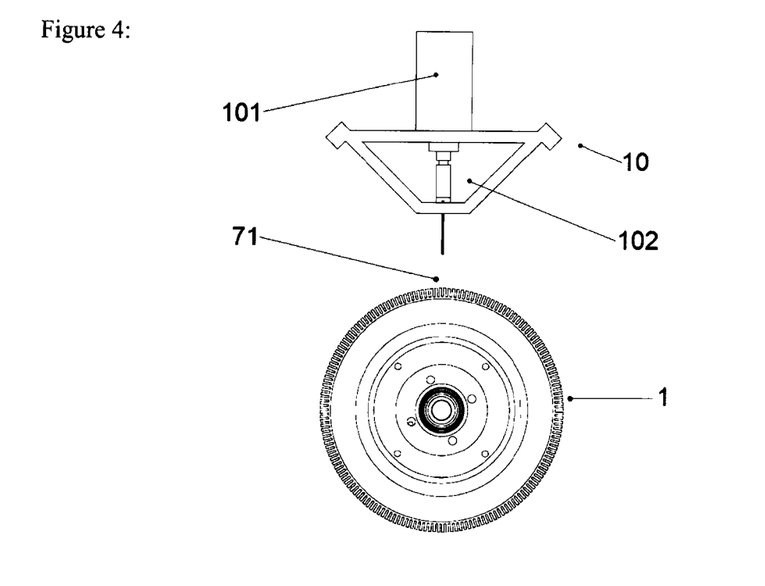
FIG. 4 is a frontal representation of the ferromagnetic core aligning step.
Figure 5:
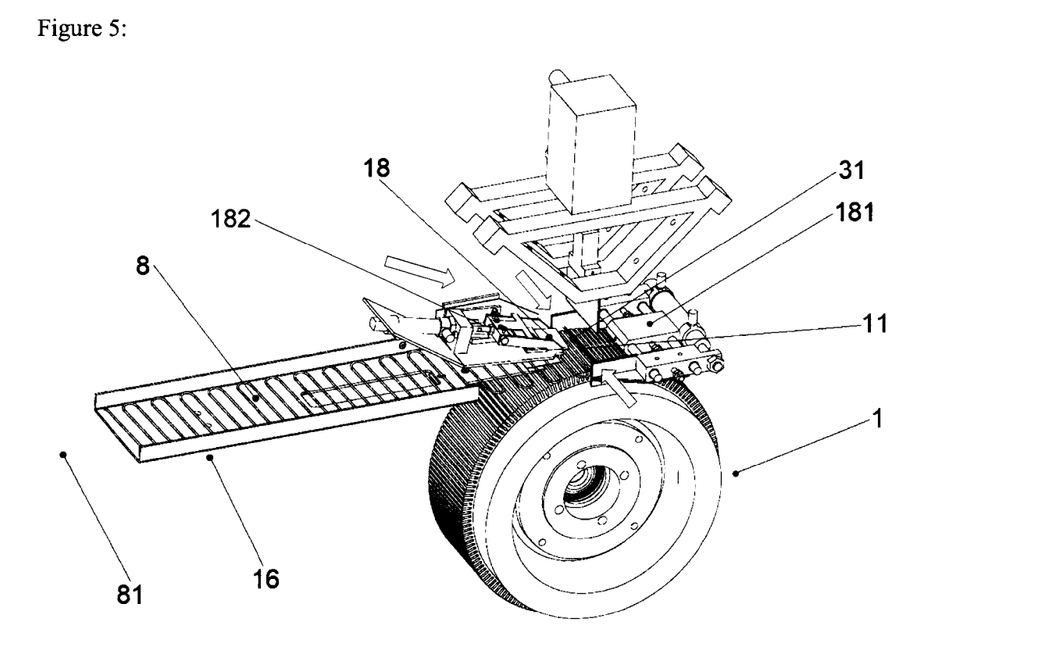
FIG. 5 is an axonometric representation of the formed wire band positioning step.
Figure 6:
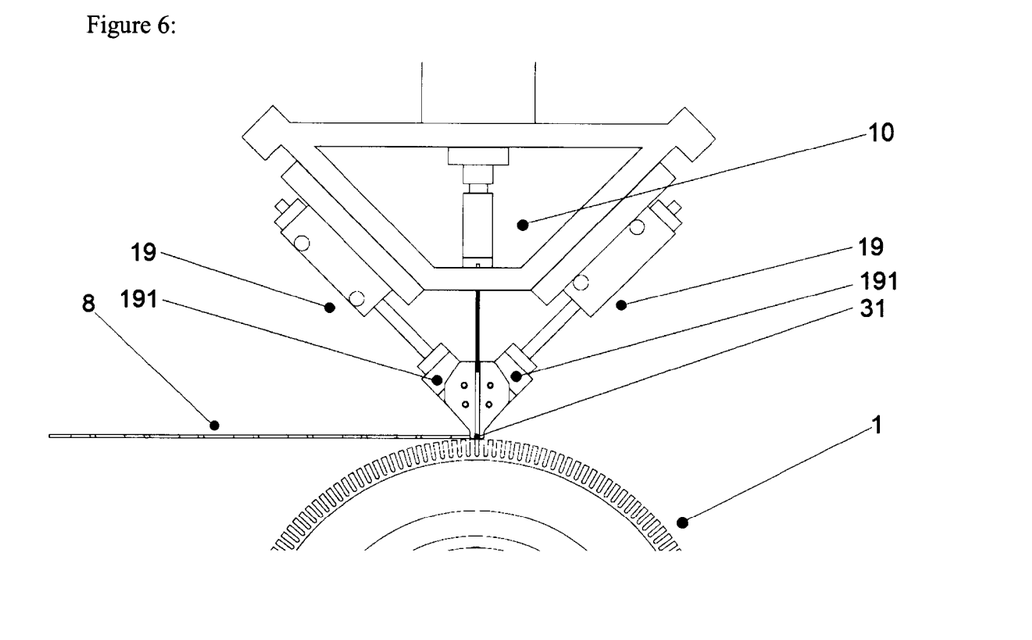
FIG. 6 is a frontal representation of the formed wire band detention step.
Figure 7:
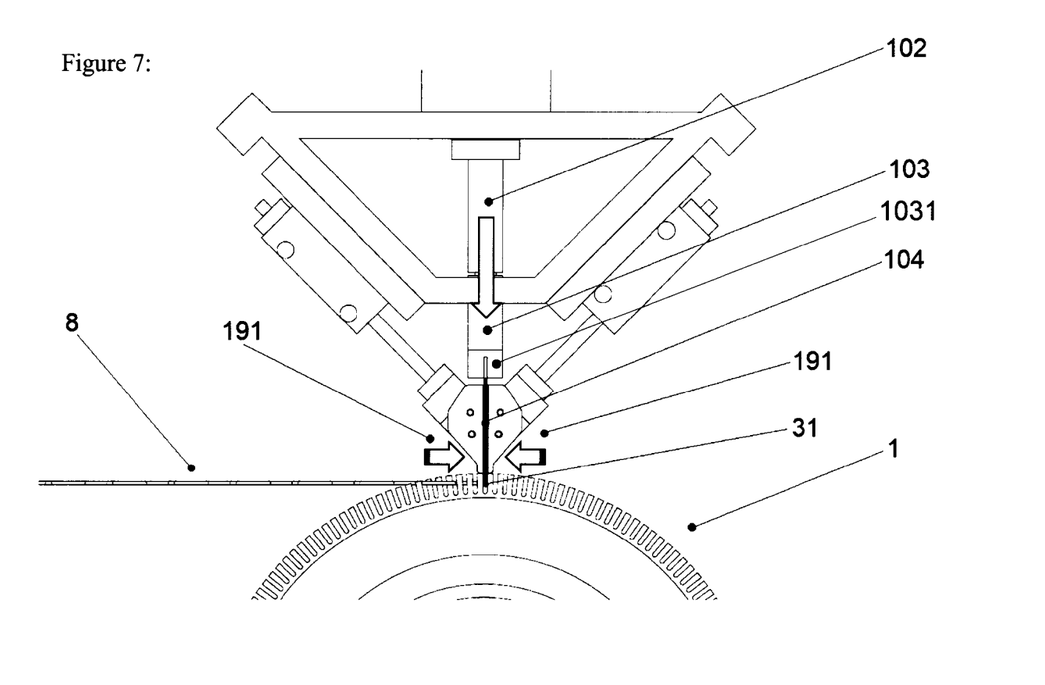
FIG. 7 is a frontal representation of the formed wire band insertion step.

In detail, a method of insertion of compact multiphase pseudo helical wave winding to electric machine, comprises:
the step of feeding of a formed wire band (8—FIG. 3) tangentially to a rotating ferromagnetic core (1—FIG. 3), wherein formed wire band straight segments (3—FIG. 1, 3) orientation is parallel to the ferromagnetic core slots (7—FIG. 2), the step of aligning the first suitable ferromagnetic core slot geometric centerline (71—FIG. 4) parallel to the geometric centerline (101—FIG. 4) of the inserting tool (102—FIG. 4) by means of step rotation of the core, where suitable means, appropriately positioned slot regarding to the winding and connection layout of the machine, the step of positioning of the first straight segment of the formed wire band (31—FIG. 5), parallel and above to the ferromagnetic core slot from the previous step, further comprising axial alignment of the formed wire band (8—FIG. 5), by means of symmetrical and simultaneous pushing of the formed wire band overhangs (4), so as to align formed wire band longitudinal centerline (81—FIG. 5) with ferromagnetic core width center (11—FIG. 5), the step of laterally and symmetrically detaining the position of the first straight segment (31—FIG. 6) of the formed wire band into position above the suitable ferromagnetic core slot, thus disabling any possible misplacement of the segment during the step of insertion, the step of inserting of the first straight segment (31—FIG. 7) of the formed wire band into the suitable ferromagnetic core slot with optimal force, so as to achieve desired depth of insertion, following the strategy of gradual layered depth positioning, wherein precursor formed wire band is being indirectly inserted into slot optimal depth by following formed wire band, being a part of later insertion step, which assures gradual layering with each following formed wire band layer, resulting in highly compact winding without damaging conductor insulation.

Figure 8:
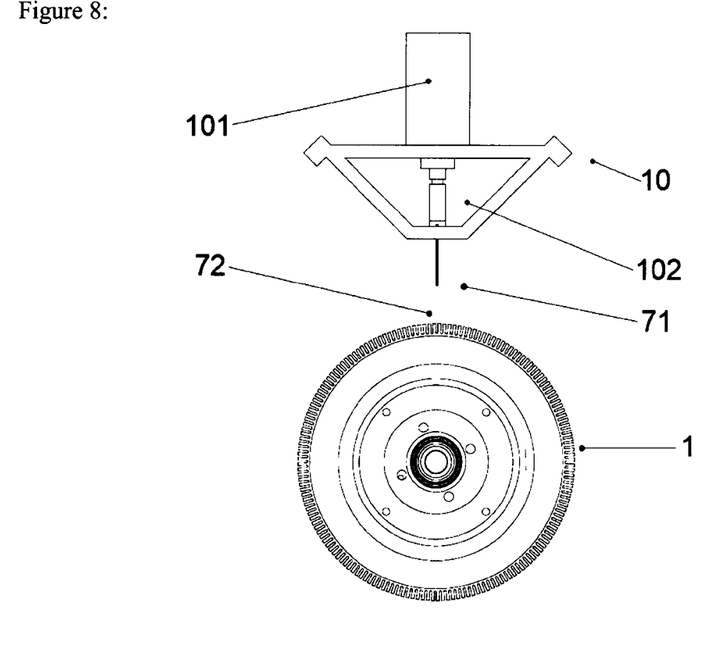
FIG. 8 is a frontal representation of the second core aligning step.

The latter step marks the point where first segment of formed wire band insertion is ended, and the steps for the next segment follows as described:
the step of aligning the second suitable ferromagnetic core slot geometric centerline (72—FIG. 8) parallel to the geometric centerline (101—FIG. 8) of the inserting tool (102—FIG. 8) by means of step rotation of the core (1—FIG. 8), so as to enable next progressive step of the insertion, while consequently simultaneously pulling and positioning second of the straight segment (32—FIG. 8) of the formed wire band above suitable ferromagnetic core slot, the step of laterally and symmetrically detaining the position of the second straight segment (32) of the formed wire band (8) into position above the suitable ferromagnetic core slot, the step of inserting of the second straight segment (32) of the formed wire band (8) into the suitable ferromagnetic core slot with optimal force, so as to achieve desired depth of insertion.

Figure 9:
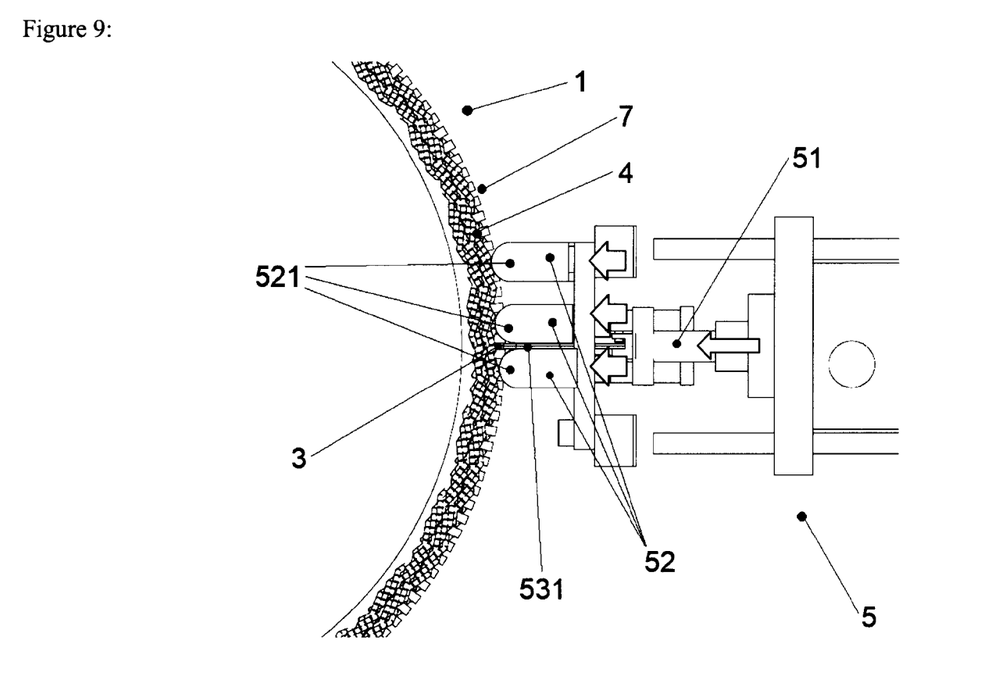
FIG. 9 is a frontal representation of the winding compaction step.

After the second formed wire band segment (32) insertion is finished, the core (1) by its step rotation is about to reach an area where compacting step is performed, therefore simultaneously, while further insertion of following formed wire band segments is occurring, the described step is performed:
the step of symmetrical and gradual compacting of the inserted segments of formed wire band with pre-formed overhangs (4—FIG. 1, 9), thus further deforming overhangs in radial direction, so as to achieve optimal winding spatial slot distribution (111—FIG. 2) and overhang layering, whereby the straight and parallel to the ferromagnetic core slots segments (3) of the formed wire band of previous steps being simultaneously detained within optimal slot (7) depth.

The insertion steps of first (31) and second (32) formed wire band (8) segments are highlighted, since optimal compacting step is achieved when at least two successive formed wire band segments are inserted, forming left and right overhang (4), where multi position compacting fingers (52) press onto them simultaneously. Compacting fingers symmetrically press overhangs on both sides of the core (1), following the insertion steps progress, until whole winding is formed within desired layout.

After insertion of the last straight segment (3) of the formed wire band (8), additional formed wire bands can be inserted, following the same insertion steps within the range of desired electrical machine layout. Additional formed wire bands can be fed and inserted successively, while their sequence, proper length, orientation, and type are being monitored and controlled by computer control unit (9), receiving feedback from multiple sensors (12).

All the beforementioned steps are synchronized to ferromagnetic core (1) step rotation and further controlled by computer control unit (9), receiving feedback from multiple sensors (12), while steps where specific force is applied are also controlled by computer control unit, receiving feedback from, and running multiple servo motors (13).

An apparatus for compact insertion of thick conductor wave winding to electrical machine and its layout presented here is directly dependent upon described method, while method itself as mentioned above, being further dependent on optimally implementing advantages of specific geometry of the multiphase pseudo helical wave winding.

Figure 10:
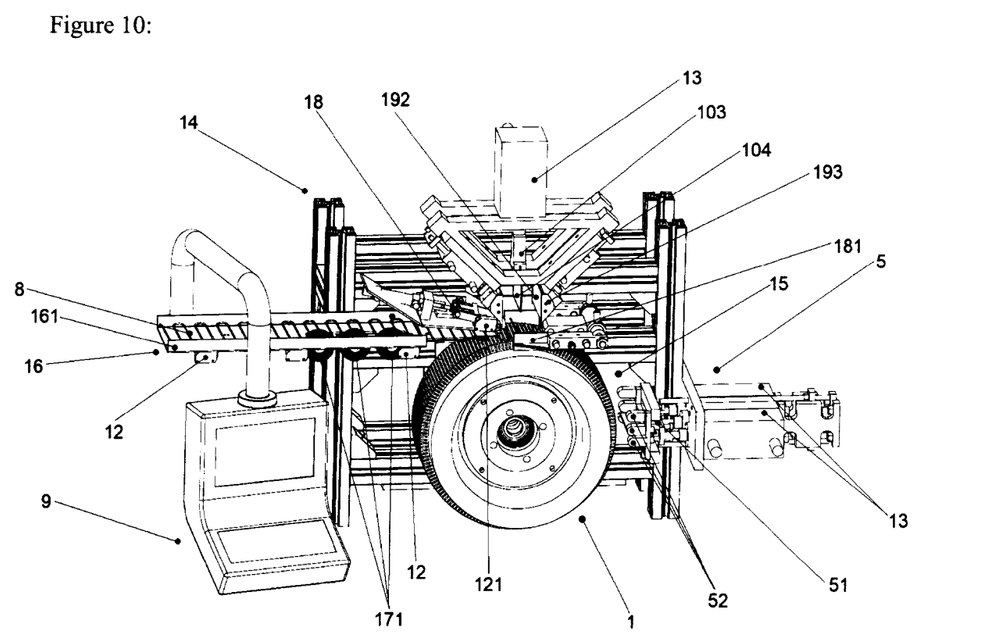
FIG. 10 is an axonometric representation of the formed wire band insertion apparatus.

A preferred embodiment of an apparatus invention is a programmable and adaptable computer controlled apparatus for compact insertion of multiphase pseudo helical wave winding into electric machine, comprising a computer control unit (9), a frame (14), a friction drive module (15), a transportation table (16), a feeding module (17), a positioning module (18), a detention module (19), an insertion module (10) and a compaction module (5).

The computer control unit (9) comprises of programmable computer (91). It is implementing and monitoring various insertion processes, according to various electric machine layouts. It further comprises usual parts like breakout board, power supply unit and user interface unit, but none of those being a subject of this invention. The computer control unit operation can be divided in two main processes. First is running specific predefined programs in accordance to various electric machine types and their specific production processes. Second is receiving feedback from multiple sensors (12). With received feedback from sensors, computer control unit is simultaneously adjusting applied force of the servo motors (13), compacting step being perfect example of such process. Sensors also detect presence, length, type and orientation of formed wire band (8), thus enabling high control of the insertion process. The frame (14) being made from sturdy and lightweight profiles and other more or less standard parts, represents the core of the apparatus assembly and in its obviousness, although being crucial, is not meant to be in focus of this invention. The friction drive module (15) mounted to the frame enables rotation of the ferromagnetic core (1). Transportation table (16) comprises adjustable axial slide guides (161) for the formed wire band. It also comprises multiple sensors positioned underneath slide guides, so as to detect formed wire band characteristics. The feeding module (17) comprises of rotating brushes (171). They are located along the formed wire band carrying path. They perform main linear transport towards conductor insertion area. The positioning module (18) comprises of axial alignment pushers (181). They sustain overall axial symmetry of the winding. Positioning module also comprises position sensor (121) which is crucial for detecting real-time position of the first straight segment (31) of the formed wire band. It further comprises motor driven positioner (182) that manipulates the first straight segment of the formed wire band into proper position for insertion. The detention module (19) comprises two motor driven, laterally and symmetrically positioned formed wire band segment position holders (191). They (while being active) are controllably pressing from each side of the formed wire band segment, and holding it in appropriate place while insertion step is performed. This enables proper position of the formed wire band segment from start to the end of insertion step. The detention surfaces (192) are made out of low friction and high durability material. They are attached to wedge shaped metal arms (193). The insertion module (10) comprises motor driven insertion tool (102). It further comprises insertion arm (103) with attachment slot (1031) where first insertion blade (104) is mounted. The compaction module (5) comprises of motor driven arm (51). It has symmetrical set of multi-position and adjustable fingers (52) attached to it, and motor driven detention tool (53). Detention tool is positioned between said symmetrical set, with second insertion blade (531) attached. Each finger position can be adjusted independently. Fingers have flexible plastic, or rubber tips (521), especially shaped, so as to optimally press onto the formed wire band overhangs (4). The insertion blade (104) of the insertion module (10) and the insertion blade (531) of the detention tool (53) of the compaction module (5), have polished surfaces and rounded edge. This enables smooth travel and guidance, while further preventing formed wire band insulation damage, and collision with ferromagnetic core slot edge.

All of the beforementioned modules are fully adaptable to various electric machine dimensions and layouts, either by adjusting their relative position within a certain range, or by incorporating additional custom parts to match electrical machine layout requirement. Typical adaptations of the modules needed for the variety of electric machine layouts, usually follow ferromagnetic core radial dimension, its axial overall width, number and skewing angle of the ferromagnetic core slots. Positional adaptations of the modules are done mainly by loosening of the fixation points, adjusting the position of the module base to specified marked position, and tightening the fixation points providing position and orientation restraint. Adaption of the insertion process itself is then only a matter of choosing appropriate computer program.

The advantages of the process and apparatus according to the invention over similar ones are numerous. For example, the winding is inserted in several steps, which assures gradual and compact insertion with no damage to conductor insulation, thus eliminating any chance of insulation breakdown and short circuit occurrence. Winding final form is completed inside an armature, which minimizes possible loosening of the formed wire segments within core slots before the potting process. Finally, achieving better winding quality and total repeatability compared to manual procedures, while operating at winding speed of approximately 1 slot per second.

The invention claimed is:

1. A method of insertion of compact multiphase pseudo helical wave winding to an electric machine, said method comprising:

a. feeding a formed wire band to a rotating ferromagnetic core tangentially, wherein a plurality of formed wire band straight segments parallel orientation of a plurality of ferromagnetic core slots;
b. rotationally aligning a first suitable ferromagnetic core slot geometric centerline parallel to a geometric centerline of an inserting tool;
c. positioning a first of the straight and parallel to the ferromagnetic core slots segment of the formed wire band above first suitable ferromagnetic core slot, including positioning said ferromagnetic core slot about a formed wire bands pole division layouts;
d. laterally and symmetrically detaining a position of the first of the straight and parallel to the ferromagnetic core slots segment of the formed wire band into a position above the first suitable ferromagnetic core slot;
e. inserting the first of the straight and parallel to the ferromagnetic core slots segment of the formed wire band into the first suitable ferromagnetic core slot with an optimal force so as to achieve desired depth of insertion;
f. rotationally aligning a second suitable ferromagnetic core slot geometric centerline parallel to the geometric centerline of the inserting tool, and including positioning a second of the straight and parallel ferromagnetic core slots segment of the formed wire band above second suitable ferromagnetic core slot;
g. laterally and symmetrically detaining a position of the second of the straight and parallel to the ferromagnetic core slots segment of the formed wire band into a position above the second suitable ferromagnetic core slot;
h. inserting the second of the straight and parallel to the ferromagnetic core slots segment of the formed wire band into the second suitable ferromagnetic core slot; and
i. symmetrical and gradual compacting of an inserted segments of formed wire band with pre-formed overhangs, and including deforming overhangs in a radial direction to define an optimal winding spatial slot distribution and an overhang layering, whereby the first and second straight and parallel ferromagnetic core slots segments of the formed wire band being simultaneously detained within an optimal slot depth.

2. The method of claim 1, including inserting an additional formed wire band after insertion of a last of the straight and parallel to the ferromagnetic core slots segment of the formed wire band.

3. The method of claim 1, wherein positioning a axial alignment of the formed wire band includes pushing the formed wire band overhangs to align formed wire band longitudinal centerline with ferromagnetic core width center.

4. The method of claim 1, wherein inserting the formed wire band segment with an optimal force to a desired depth of insertion includes indirectly inserting into a slot comprising an optimal depth by following formed wire band being inserted, wherein each following formed wire band layer achieving a highly compact winding without damaging a conductor insulation.

5. The method of claim 1, wherein aligning said second suitable ferromagnetic core slot geometric centerline parallel to the geometric centerline comprises simultaneous pulling of a whole formed wire band in a progressive direction tangentially to the ferromagnetic core.

6. The method of claim 1, wherein symmetrical and gradual compacting includes simultaneously inserting a plurality of wire band segments.

7. The method of claim 1, including controlling by a computer control unit receiving feedback from a plurality of sensors.

8. The method of claim 2, including feeding and inserting an additional formed wire band successively while a corresponding sequence, proper length, orientation, and type are being monitored.

9. The method of claim 8, including controlling by computer control unit a receiving feedback from multiple sensors.

10. The method of claim 4, wherein a force of insertion comprises a variable, radial layer dependent, and not more than 20% different from the force calculated by the equation=$F_0$+(n c), wherein n representing the layer number counted from the lowest radially positioned conductor, $F_O$ representing empirical baseline force, $F_f$ representing first layer force, and c representing empirical constant.

11. A programmable apparatus for compact insertion of multiphase pseudo helical wave winding into an electric machine, said apparatus comprising:
a. a computer control unit;
b. a frame;
c. a friction drive module mounted to the frame to enable rotation of a ferromagnetic core;
d. a transportation table including a plurality of adjustable formed wire band axial slide guides and a plurality of sensors aligned underneath said slide guides;
e. a feeding module including a plurality of rotating brushes aligned along and underneath said band transportation table;
f. a positioning module including a plurality of formed wire band axial alignment pushers, a position sensor, and a motor driven formed wire band straight segment positioner;
g. a detention module including two motor driven laterally and symmetrically positioned formed wire band segment position holders;
h. an insertion module including a motor driven insertion tool and an insertion arm with attachment slot; and
i. a compaction module including a motor driven arm with a symmetrical set of multiple position adjustable fingers and motor driven detention tool positioned between said symmetrical set.

12. The apparatus according to claim 11, including a set of independently adjustable multiple position adjustable fingers adapted for optimal layering of the formed wire band overhangs.

13. The apparatus according to claim 11, wherein formed wire band segment position holders of the detention module, comprise low friction and high durability material on detention surfaces, attached to wedge shaped metal arms.

14. The apparatus according to claim 13, including at least one various insertion process.

15. The apparatus according to claim 11, wherein said insertion module includes an insertion arm with an attachment slot.

16. The apparatus according to claim 15, wherein a first insertion blade having a plurality of polished surfaces and rounded edges adapted to prevent formed wire band insulation damage.

17. The apparatus according to claim 16, wherein said first insertion blade having a plurality of polished surfaces and rounded edges adapted to prevent ferromagnetic core slot edge collision.

18. The apparatus according to claim 11, wherein said compaction module includes a second insertion blade having a plurality of polished surfaces and rounded edges.

19. The apparatus according to claim 11, wherein said plurality of sensors are adapted to detect a selection chosen from a group consisting of a presence, a length, a type, and an orientation of a formed wire band.

20. A method of insertion of compact multiphase pseudo helical wave winding to an electric machine, said method comprising:
   a. feeding a formed wire band to a rotating ferromagnetic core tangentially, wherein a plurality of formed wire band straight segments parallel orientation of a plurality of ferromagnetic core slots;
   b. rotationally aligning a first ferromagnetic core slot geometric centerline parallel to a geometric centerline of an inserting tool;
   c. positioning a first of the straight and parallel to the ferromagnetic core slots segment of the formed wire band above first suitable ferromagnetic core slot;
   d. laterally and symmetrically detaining a position of the first of the straight and parallel to the ferromagnetic core slots segment of the formed wire band into a position above the first suitable ferromagnetic core slot;
   e. inserting the first of the straight and parallel to the ferromagnetic core slots segment of the formed wire band into the first suitable ferromagnetic core slot;
   f. rotationally aligning a second suitable ferromagnetic core slot geometric centerline parallel to the geometric centerline of the inserting tool, and including positioning a second of the straight and parallel ferromagnetic core slots segment of the formed wire band above second suitable ferromagnetic core slot;
   g. laterally and symmetrically detaining a position of the second straight and parallel to the ferromagnetic core slots segment of the formed wire band into a position above the second suitable ferromagnetic core slot;
   h. inserting the second of the straight and parallel to the ferromagnetic core slots segment of the formed wire band into the second suitable ferromagnetic core slot; and
   i. symmetrical and gradual compacting of the inserted segments of formed wire band with pre-formed overhangs.

* * * * *